(12) United States Patent
Iwamoto et al.

(10) Patent No.: US 7,174,251 B2
(45) Date of Patent: Feb. 6, 2007

(54) KNOCKING DETECTION APPARATUS AND DETECTING METHOD

(75) Inventors: Takashi Iwamoto, Tokyo (JP); Jun Mitsuishi, Hyogo (JP); Kimihiko Tanaya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 46 days.

(21) Appl. No.: 10/829,212

(22) Filed: Apr. 22, 2004

(65) Prior Publication Data

US 2004/0244468 A1 Dec. 9, 2004

(30) Foreign Application Priority Data

May 19, 2003 (JP) ............... 2003-140852

(51) Int. Cl.
*G01M 15/11* (2006.01)
(52) U.S. Cl. ..................... 701/111; 73/35.08
(58) Field of Classification Search ............ 73/35.08
See application file for complete search history.

(56) References Cited

U.S. PATENT DOCUMENTS

| | | | | |
|---|---|---|---|---|
| 5,230,316 A | * | 7/1993 | Ichihara et al. | 123/406.38 |
| 5,687,082 A | * | 11/1997 | Rizzoni | 701/111 |
| 5,769,049 A | * | 6/1998 | Nytomt et al. | 123/435 |
| 6,246,952 B1 | | 6/2001 | Honda | |
| 6,336,355 B1 | | 1/2002 | Sasaki et al. | |
| 6,427,662 B2 | | 8/2002 | Tanaya et al. | |
| 6,456,927 B1 | * | 9/2002 | Frankowski et al. | 701/111 |
| 6,550,456 B1 | | 4/2003 | Uchida et al. | |
| 6,805,099 B2 | * | 10/2004 | Malaczynski et al. | 123/435 |

FOREIGN PATENT DOCUMENTS

| | | |
|---|---|---|
| JP | 61-57830 | 3/1986 |
| JP | 9-228941 | 9/1997 |
| JP | 11-2175 | 1/1999 |

OTHER PUBLICATIONS

Thomas, J.H. and B. Dubuisson, "A Diagnostic Method using Wavelets Networks: Application to Engine Knock Detection", IEEE International Conference on Systems, Man and Cybernetics, pp. 244-249 (1996).*

* cited by examiner

*Primary Examiner*—John E. Chapman
(74) *Attorney, Agent, or Firm*—Leydig, Voit & Mayer, Ltd.

(57) ABSTRACT

A knocking detection apparatus including: spark plugs disposed in cylinders of an internal combustion engine; an ion current detector for detecting ion currents flowing in the spark plugs; a time-frequency transformer for setting time intervals allowing one or more overlaps within a time from after ignition by the spark plugs to until the spark plug in the respective cylinder or in another cylinder next ignites and sampling ion currents in the respective time intervals to determine the time-frequency components of the ion current; a knocking detector for detecting knocking based on the time-frequency components; and a detection controller for inputting running status and controlling the time-frequency transformer and the knocking detector.

16 Claims, 4 Drawing Sheets

KNOCKING DETECTION APPARATUS AND DETECTING METHOD

BACKGROUND OF THE INVENTION

1. Field of the Invention

The present invention relates to a knocking detection apparatus and detection method that detect, with high precision, the presence of knocking and the timing thereof from changes in ion currents that are detected using spark plugs at the time of combustion of an internal combustion engine.

2. Description of the Related Art

It is known that ions are generated when fuel is combusted inside the cylinders of an internal combustion engine and that these ions can be measured as ion currents by disposing probes that apply a high voltage inside of the cylinders. Because knocking vibration components are superposed on the ion currents when knocking occurs in an internal combustion engine, the occurrence of knocking can be detected by detecting these vibration components. However, spark noise includes many frequency components superposed on the ion currents, end up being detected as vibration components of knocking, and are mistakenly determined to be knocking even if knocking is not actually occurring.

The following technologies have been disclosed as technologies to avoid this drawback. First, the technology disclosed in Japanese Patent No. 3184451 (pp. 2–3, FIGS. 1 and 2) (Japanese Published Patent Application 9-228941) includes a bandpass filter that filters only the knocking frequency components superposed on the ion currents when knocking has occurred and a noise bandpass filter that allows frequency components different from the knocking frequency components to pass. For example, by blocking noise resulting from the operation of an injector, when detected through the noise bandpass filter, using a switch, a knocking signal is not input to a determination circuit.

In the technology disclosed in JP-A-11-2175 (pp. 3–4, FIGS. 1 and 3), signals based on the ion currents pass through a high-pass filter, and knocking signals pass through a filter allowing a specific frequency band to pass. Only the noise component is separately retrieved, using the filter obstructing the specific frequency band, the peaks of both are respectively held, digitally converted, and imported to control means. Both signals are compared by the control means, and it is determined whether knocking is occurring from the compared signals.

Moreover, in JP-A-61-57830 (pp. 3–4, FIGS. 1 and 3) signals obtained through a filter selectively passing knocking signals based on the ion currents and a filter selectively passing unique vibration frequencies generated by the mechanical dimensions of each cylinder are respectively integrated over a predetermined period. Signals indicating the occurrence of knocking are obtained from the ratio of the respective integrated values. The signals are integrated during a predetermined number of revolutions, whereby knocking is detected.

Moreover, in JP-A-11-295188 (pp. 5–8, FIGS. 9 to 11) signals based on the ion currents are passed through a high-pass filter and a low-pass filter, whereby only a knocking detection signal is extracted. The knocking detection signal is A/D converted, and a discrete Fourier transform is applied. The resulting frequencies are analyzed to determine whether the signal results from knocking or from noise, and the running state of the internal combustion engine is determined.

As described above, these various technologies have been disclosed. However, in the case of Japanese Patent No. 3184451, even if a signal including the knocking component is detected, it is determined to be invalid if a signal including spark noise is included, and it is mistakenly determined that knocking is not occurring even if knocking is occurring. Also, the ion currents are signals that are small, depending on the running state, and the noise signal becomes large when the operating noise of the injector and external noise, such as from a phone are superposed, so that knocking cannot be completely detected with the methods of JP-A-11-2175 and JP-A-61-57830.

Also, the prior art uses, as the detection target, time intervals between each ignition as units in relation to knocking detection. Use of these time intervals cannot accurately detect knocking, because knocking appears and disappears in units of time shorter than these time intervals. For this reason, there has been the problem that control methods cannot be made to correspond to the timing of knocking occurrence. Moreover, there have been problems. The resistance of the determination function, with respect to ion current signals whose amplitude has been increased due to the influence of additives added to the fuel, is low. The ion currents have superposed impulse noise including many frequency components. Also, in all of the prior examples, knocking determination precision has been low because the time resolution has been low.

SUMMARY OF THE INVENTION

The present invention has been made in order to solve these problems, and it is an object thereof to detect, with high precision, the occurrence of knocking and the timing thereof with time units narrower than intervals between ignitions, even in a case where the ion currents generated inside the cylinders of an internal combustion engine are measured and noise is superposed on the ion currents.

A knocking detection apparatus pertaining to the invention comprises: spark plugs disposed in cylinders of an internal combustion engine; ion current detecting means for detecting ion currents flowing in the spark plugs; time-frequency transforming means for setting time intervals, with one or more time overlaps, within a time from ignition by a spark plug in a corresponding cylinder or in another cylinder, until the next ignition, and sampling current values of the ion currents in the respective time intervals to determine the frequency components thereof; knocking detecting means for detecting knocking on the basis of the frequency components; and detection control means receiving running status of the internal combustion engine and controlling the time-frequency transforming means and the knocking detecting means.

A knocking detection method pertaining to the invention includes: ion current detecting means for detecting ion currents using spark plugs disposed in cylinders of an internal combustion engine; time-frequency transforming means for setting time intervals allowing time overlaps within a time from after ignition by a spark plugs in a corresponding cylinder or another cylinder, until the next ignition, and sampling current values of the ion currents in the respective time intervals to determine the frequency components thereof; knocking detecting means for detecting knocking on the basis of the frequency components; and detection control means for controlling the time-frequency transforming means and the knocking detecting means, wherein the detecting control means receives running status of the internal combustion engine and controls the time-frequency transforming means and the knocking detecting means determining frequency components from sampled values of the ion currents.

DESCRIPTION OF THE PREFERRED EMBODIMENTS

First Embodiment

Figure 1:
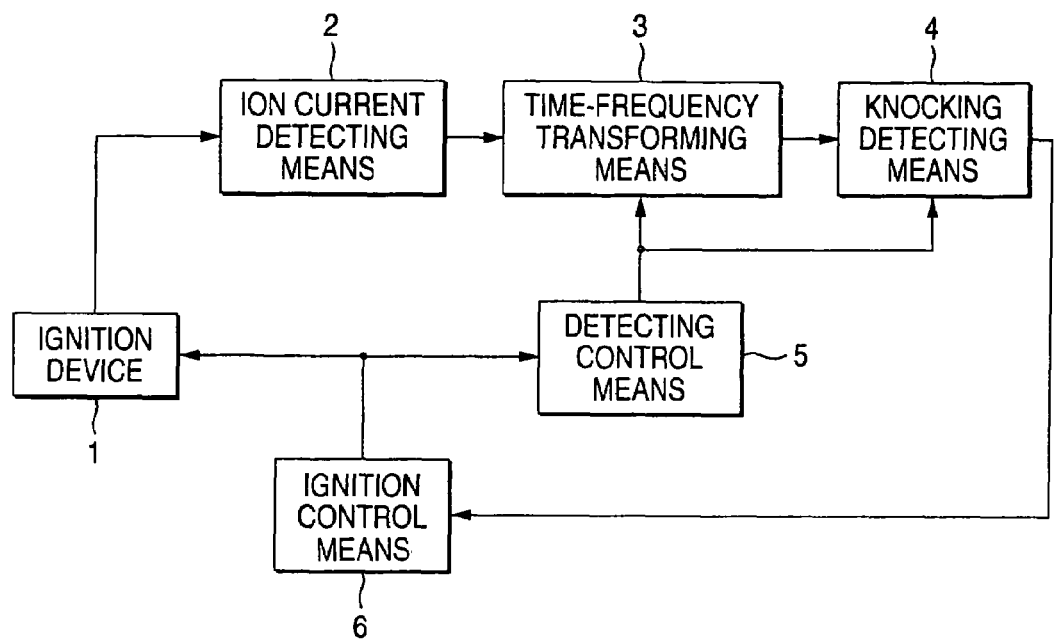
FIG. 1 is a block diagram showing a schematic configuration of a knocking detection apparatus and detection method according to a first embodiment of the invention.
Figure 2:
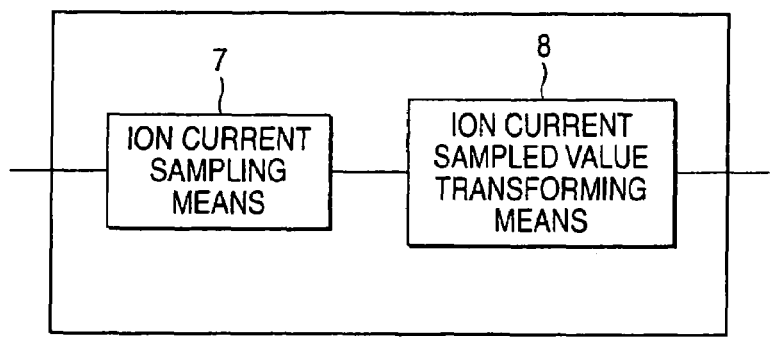
FIG. 2 is a block diagram describing ion current sampling in the knocking detection apparatus and detection method according to the first embodiment of the invention.
Figure 3:
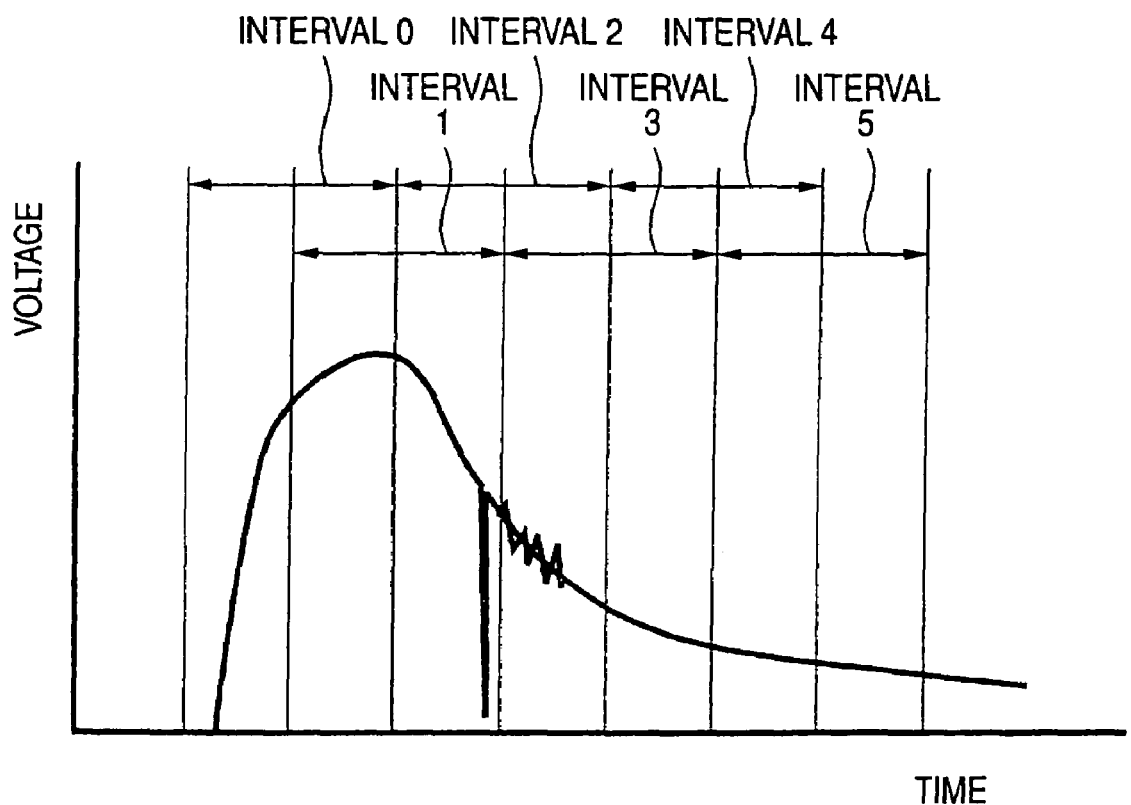
FIG. 3 is an explanatory graph of ion current detection intervals in the knocking detection apparatus and detection method according to the first embodiment of the invention.
Figure 4:
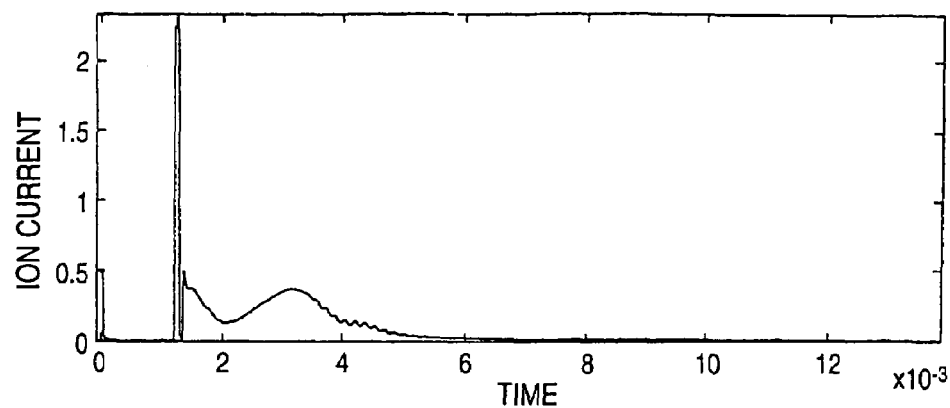
FIGS. 4(A), 4(B), and 4(C) are explanatory graphs of time-frequency transformation and knocking determination function values in the knocking detection apparatus and detection method according to the first embodiment of the invention.
Figure 4:
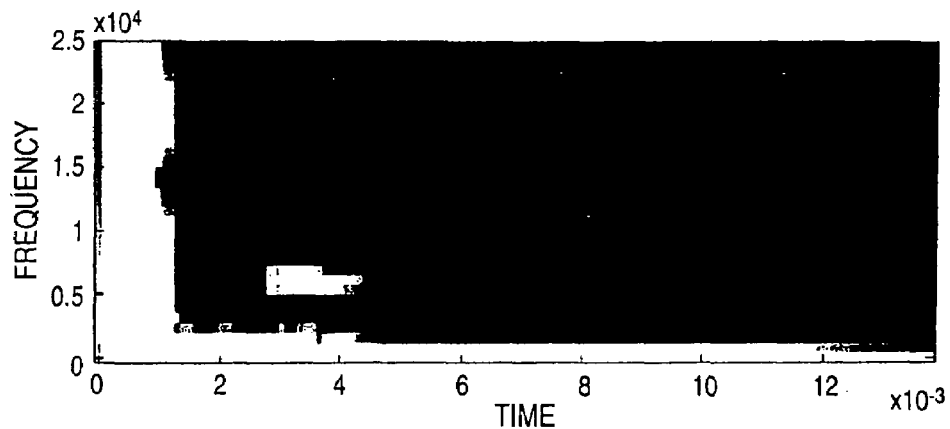
Figure 4:
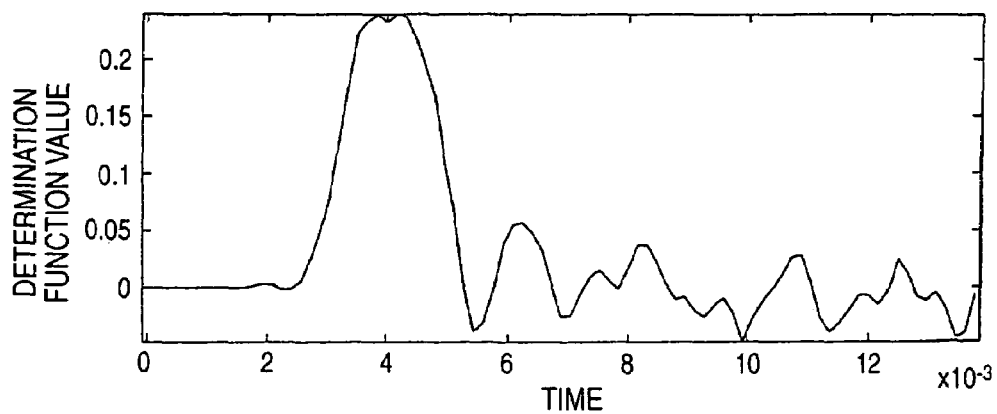

FIGS. 1 to 4(C) are diagrams describing a knocking detection apparatus and detection method according to a first embodiment of the invention. FIG. 1 is a block diagram showing a schematic configuration of the knocking detection apparatus and detection method, FIG. 2 is a block diagram describing ion current sampling, FIG. 3 is an explanatory graph showing sampled intervals in ion current detection, and FIGS. 4(A), 4(B) and 4(C) are explanatory graphs describing the result of time-frequency transformation of ion currents and knocking determination function values.

In FIG. 1, an ignition device 1 includes a publicly-known ignition circuit. An ion current detecting means 2 detects an ion current from the current of a secondary ignition circuit and is a publicly-known ion current detection circuit. As described later, time-frequency transforming means 3 applies a Fourier transform so that knocking can be determined from an ion current signal, and knocking detecting means 4 determines the presence of knocking from the result of transformation by the time-frequency transforming means 3 and detects the timing of the knocking.

Detection control means 5 receives the running status of an internal combustion engine, controls the time-frequency transforming means 3 and the knocking detecting means 4, and transforms, in accordance with the running status of the internal combustion engine, sampled times of ion current values resulting from the time-frequency transforming means 3 and an ion current sample number serving as the target of time-frequency transformation. The result of detection by the knocking detecting means 4 is given to ignition control means 6, and the ignition control means 6 controls ignition times in accordance with the state of knocking.

The time-frequency transforming means 3 includes ion current sampling means 7 and ion current sampled value transforming means 8 shown in FIG. 2. The time-frequency transforming means 3 first determines ion current sampled values $x(0)$, $x(\Delta T)$, $x(2\Delta T)$, ... from the detected ion currents with respect to 0, $\Delta T$, $2\Delta T$, ... which are fixed intervals from a starting point determined by the detection control means 5. In this embodiment, $\Delta T=5$ μs is used as an example, but $\Delta T$ can be optionally set depending on conditions.

Next, the time-frequency transforming means 3 determines the frequency components $C_n(f)$ in respective time periods of each time interval from the sampled ion currents in the time periods. These sampled ion currents are represented by the set In $=(Tn, Tn+\Delta T, \ldots, Tn+(M-1)\Delta T)$, where M represents the number of such ion current samples in each time interval. The time interval include overlaps in an amount determined by the detection control means 5. That is, here, the time-frequency transforming means 3 sets, as shown in FIG. 3, a set of time intervals with one or more overlaps of adjacent time intervals, from the ignition determined by the detection control means 5 until another ignition occurs in a cylinder, samples the ion currents with respect to each time period in each time interval, and determines the frequency components of each ion current sample. In the present embodiment, an example is described in which the total number of time periods in each interval is M=256, and time periods are recursively defined as $T_{n+1}=T_n+(M/K)\Delta T$ (where K=8 and n=0, 1, 2, ... ), but the effectiveness of the invention is not limited to these values.

A specific way of determining the frequency components uses a short-time Fourier transform using a Hanning window W(m) of an order M, defined by the following equation, as one example in this embodiment, but the effectiveness of the invention is not limited to this selection of the Hanning window function.

[Equation 1]

$$w(m)=\{1-\cos[2\pi(m+1)/(M+1)]\}/2 \qquad (1)$$

Here, m=(0, 1, 2 ... M−1), the symbol cos(x) represents a cosine function of x, and the symbol π represents pi.

With respect to the time periods, the frequency components $C_n(f)$ (where f=0, 1, 2 ... M−1) are determined by the following equation.

[Equation 2]

$$C_n(f)=\Sigma\{0 \leq M-1\}\{x(Tn+m\Delta T)w(m)\exp(-2\pi ifm/(M-1))\} \qquad (2)$$

Here, the symbol i represents the imaginary unit, and, exp represents an exponential function. Also, with respect to a sequence in the form $\{a(m)\}$, the symbol $\Sigma\{0 \leq m \leq M-1\}\{a(m)\}$ represents an operation that corresponds to the sum $a(0)+a(1)+\ldots+a(M-1)$ of the sequence.

Below, with respect to a logical expression f(x) and the sequence a(x), $\Sigma\{f(x)\}\{a(x)\}$ represents an operation that corresponds to the sum $a(x_0)+a(x_1)+\ldots+a(x_k)$ (where $\{x_0, x_1, x_k\}$ is a set of numbers satisfying the logical expression f(x)) of the sequence of the set of x, where the logical expression f(x) becomes a true value.

The knocking detecting means 4 does not require all frequency components. Because of the condition that the original ion current sampled values are real numbers, all of the frequency components $C_n(f)$ (where $\{f=0, 1, \ldots M-1\}$) are not independent of each other. In the time-frequency transforming means 3, the frequency components $C_n(f)$ are determined only with respect to the values of f necessary to the knocking detecting means 4, which the detection control means 5 determines.

It is commonly known that knocking causes vibrations having as primary components frequencies determined by the shape, pressure, temperature, and molecular weight of a gaseous mixture inside the cylinders. Of those frequencies, the frequency where the amplitude experimentally reaches a maximum is taken as a primary frequency $f_0$, and frequencies at opposite sides of the frequency $f_0$, where the amplitudes experimentally reach a minimum, are taken as $f^-$ and $f^+$. In this embodiment, only the frequency components $C_n(f_0)$, $C_n(f^-)$, and $C_n(f^+)$, with respect to $f_0=6$, $f^-=3$, and $f^+=9$, are calculated, but it is also possible to vary this selection in accordance with running status of the engine. Also, the effectiveness of the invention is not limited to these values.

When knocking occurs and vibrations are caused, the absolute value $|C_n(f_0)|$ of the primary vibration component has a large value. (The symbol $|x|$ represents the absolute value of x.) However, the primary vibration component can also have a large value when impulse noise is superposed on the ion current. Thus, in the knocking detecting means 4, the following determination equation is calculated.

[Equation 3]

$$D(n)=(2\times|C_n(f_0)|-|C_n(f^-)|-|C_n(f^+)|) \tag{3}$$

While D(n) takes a large positive value with respect to the sampled ion currents when vibration caused by knocking arises, it becomes possible to suppress the influence of impulse noise. However, when the ion currents themselves are amplified by additives, the value produced by the determination equation (3) is proportional to the ion current intensity coefficient, which is the amplification degree. In order to prevent an erroneous determination resulting from this influence, the determination equation is divided by a standardizing factor C defined by the following equation.

[Equation 4]

$$C_n=[\Sigma\{0\leq f\leq M/2-1\}\{|Cn(f)|^2\}]^{(1/2)} \tag{4}$$

In this manner, a determination function E(n) having high resistance to the superposition of impulse noise and changes in the ion current intensity coefficient is obtained from the following equation.

[Equation 5]

$$E(n)=(2\times|C_n(f_0)|-|C_n(f^-)|-|Cn(f^+)|)/[\Sigma\{0\leq f\leq M/2-1\}\{|C_n(f)|^2\}]^{(1/2)} \tag{5}$$

In the present embodiment, the determination function value is compared to a preset threshold Th, but the determination function may be determined by a similar function meeting the above-described impulse noise resistance.

FIGS. 4(A), 4(B), and 4(C) show results applied to specific data of this embodiment. The determination function values shown in FIG. 4(C) are obtained from the ion current shown in FIG. 4(A), and knocking can be reliably determined by making the threshold Th 0.1. The change in the intensity of the frequency components catches the vibration generated by knocking, the values of the determination function greatly exceed the threshold, and knocking is clearly detected. It should be noted that, although in the described example Th=0.1, in this embodiment, the effectiveness of the invention is not limited to this value.

Second Embodiment

Figure 5:
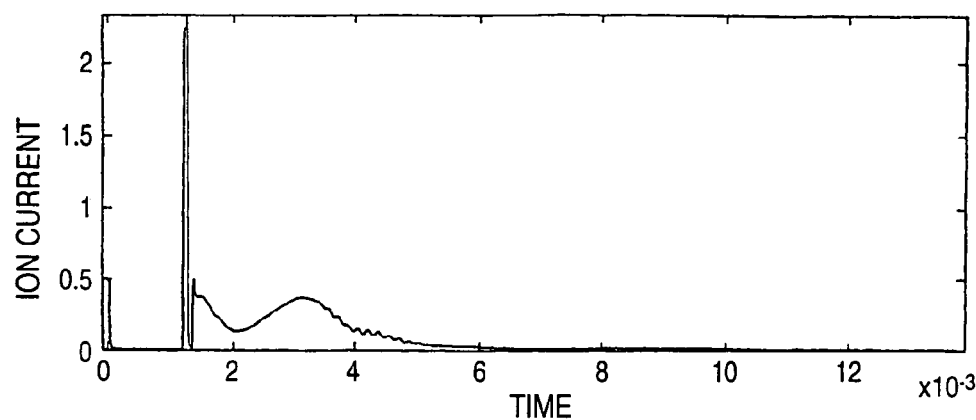
FIGS. 5(A), 5(B), and 5(C) are explanatory graphs of time-frequency transformation and knocking determination function values in a knocking detection apparatus and detection method according to a second embodiment of the invention.
Figure 5:
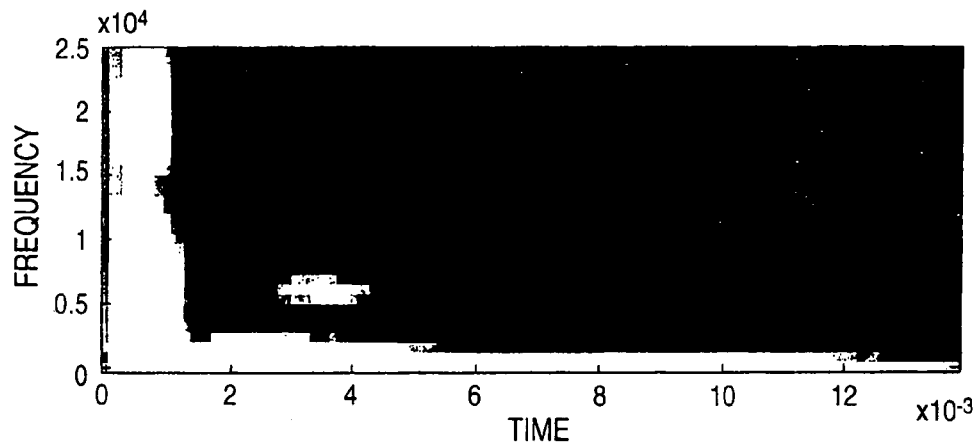
Figure 5:
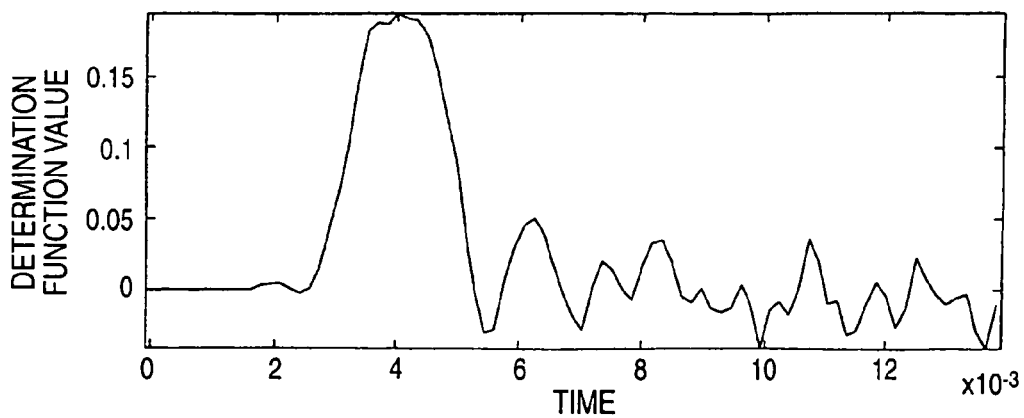

FIGS. 5(A), 5(B), and 5(C) are explanatory graphs describing ion current time-frequency transformation results and knocking determination function values in a knocking detection apparatus and detection method according to a second embodiment of the invention. In the first embodiment, the frequency components were determined by a short-time Fourier transform using a Hanning window function, but in the present embodiment, the window function of equation 6 is used to obtain a Gabor wavelet component.

[Equation 6]

$$w(m)=\exp(-L(m-(M-1)/2)^2) \tag{6}$$

FIGS. 5(A), 5(B), and 5(C) show the results when equation 6 is applied to specific data for this embodiment, and show that the occurrence of knocking greatly exceeds the threshold Th=0.1 and can be determined. Thus, even in this embodiment, knocking is clearly detected, as in the first embodiment. It should be noted that, although $L=800/(M-1)_2$ was used as an example for L in equation 6 for this embodiment, the effectiveness of the invention is not limited to this value.

As described above, the knocking detection apparatus of the invention comprises: spark plugs disposed in cylinders of an internal combustion engine; ion current detecting means for detecting ion currents flowing in the spark plugs; time-frequency transforming means setting time intervals with overlaps, within a time from after ignition by a spark plug in a corresponding cylinder or in another cylinder, until the next ignition, and sampling current values of the ion currents in the respective time intervals to determine the frequency components thereof; knocking detecting means for detecting knocking on the basis of the frequency components; and detection control means for receiving running status of the engine and controlling the time-frequency transforming means and the knocking detecting means. Thus, the knocking detection apparatus of the invention can precisely grasp the distribution of constantly changing combustion energy and can determine knocking and precisely detect the time of occurrence of knocking.

The knocking detection method of the invention includes: ion current detecting means for detecting ion currents using spark plugs disposed in cylinders of an internal combustion engine; time-frequency transforming means for setting time intervals with overlaps within a time from ignition of a spark plug in a corresponding cylinder or in another cylinder, until the next ignition, and sampling current values of the ion currents in the respective time intervals to determine the frequency components thereof; knocking detecting means for detecting knocking on the basis of the frequency components; and detection control means for controlling the time-frequency transforming means and the knocking detecting means, including detecting knocking by the detecting control means receiving running status of the internal combustion engine and controlling the time-frequency transforming means and the knocking detecting means to determine frequency components from sampled values of the ion currents. Thus, the knocking detection method of the invention can detect knocking without mistaken operation with respect to noise from different time intervals, can detect knocking without mistaken operation with respect to fuel where the ion current intensity coefficients are different, and enables control of an internal combustion engine in accordance with the occurrence and timing of knocking.

What is claimed is:
1. A knocking detection apparatus comprising:
spark plugs disposed in cylinders of an internal combustion engine;
ion current detecting means for detecting ion currents flowing in the spark plugs;
time-frequency transforming means for, within time intervals, allowing at least one overlap of respective inter- vals, from a time after ignition by one of the spark plugs until the spark plug in the respective cylinder or in another cylinder next ignites, sampling the ion currents in the respective time intervals and determining frequency components of the ion currents sampled using a short-time Fourier transform.

2. The knocking detection apparatus of claim 1, wherein the knocking detecting means detects occurrence of knocking and timing of knocking occurrence.

3. The knocking detection apparatus of claim 1, wherein the detection control means changes at least one of (i) sampled times where the time-frequency transforming means samples ion currents in accordance with the running status of the internal combustion engine and (ii) ion current sample number serving as a target of time-frequency transformation.

4. The knocking detection apparatus of claim 1, wherein resistance with respect to impulse noise and ion current intensity changes indicating knocking is raised by dividing, by a standardizing factor, a knocking determination equation that the knocking detecting means computes.

5. A knocking detection apparatus comprising:
spark plugs disposed in cylinders of an internal combustion engine;
ion current detecting means for detecting ion currents flowing in the spark plugs;
time-frequency transforming means for, within time intervals, allowing at least one overlap of respective intervals, from a time after ignition by one of the spark plugs until the spark plug in the respective cylinder or in another cylinder next ignites, sampling the ion currents in the respective time intervals and determining frequency components of the ion currents sampled using a Gabor wavelet transform.

6. The knocking detection apparatus of claim 5, wherein the knocking detecting means detects occurrence of knocking and timing of knocking occurrence.

7. The knocking detection apparatus of claim 5, wherein the detection control means changes at least one of (i) sampled times where the time-frequency transforming means samples ion currents in accordance with the running status of the internal combustion engine and (ii) ion current sample number serving as a target of time-frequency transformation.

8. The knocking detection apparatus of claim 5, wherein resistance with respect to impulse noise and ion current intensity changes indicating knocking is raised by dividing, by a standardizing factor, a knocking determination equation that the knocking detecting means computes.

9. A knocking detection method including:
detecting ion currents using spark plugs disposed in cylinders of an internal combustion engine;
setting time intervals, allowing at least one overlap of respective intervals within a time from after ignition by one of the spark plugs until the spark plug in the respective cylinder or in another cylinder next ignites;
sampling the ion currents in the respective time intervals, time-frequency transforming the ion currents sampled, and determining frequency components of the ion currents; and
detecting knocking based on the frequency components of the ion current samples and running status of the internal combustion engine, and controlling the time-frequency transforming to determine the frequency components of the ion currents sampled using a short-time Fourier transform.

10. The knocking detection method of claim 9, including detecting occurrence of knocking and the timing of knocking occurrence.

11. The knocking detection method of claim 9, including changing at least one of (i) sampled times while sampling ion currents in accordance with the running status of the internal combustion engine and (ii) ion current sample number serving as a target of the time-frequency transforming.

12. The knocking detection method of claim 9, including raising resistance to impulse noise and ion current intensity changes by dividing, by a standardizing factor, a knocking determination equation used in detecting knocking.

13. A knocking detection method including:
detecting ion currents using spark plugs disposed in cylinders of an internal combustion engine;
setting time intervals, allowing at least one overlap of respective intervals within a time from after ignition by one of the spark plugs until the spark plug in the respective cylinder or in another cylinder next ignites;
sampling the ion currents in the respective time intervals, time-frequency transforming the ion currents sampled, and determining frequency components of the ion currents; and
detecting knocking based on the frequency components of the ion currents sampled and running status of the internal combustion engine, and controlling the time-frequency transforming to determine the frequency components of the ion currents sampled using a Gabor wavelet transform.

14. The knocking detection method of claim 13, including detecting occurrence of knocking and the timing of knocking occurrence.

15. The knocking detection method of claim 13, including changing at least one of (i) sampled times while sampling ion currents in accordance with the running status of the internal combustion engine and (ii) ion current sample number serving as a target of the time-frequency transforming.

16. The knocking detection method of claim 13, including raising resistance to impulse noise and ion current intensity changes by dividing, by a standardizing factor, a knocking determination equation used in detecting knocking.

* * * * *